United States Patent
Mizusawa (10) Patent No.: US 7,436,591 B2
(45) Date of Patent: Oct. 14, 2008

(54) EPI ILLUMINATION OPTICAL SYSTEM FOR MICROSCOPES

(75) Inventor: Masayuki Mizusawa, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/755,362

(22) Filed: May 30, 2007

(65) Prior Publication Data
US 2008/0007825 A1   Jan. 10, 2008

(30) Foreign Application Priority Data
May 31, 2006   (JP) ............................. 2006-150993

(51) Int. Cl.
*G02B 21/06* (2006.01)
*G02B 21/00* (2006.01)

(52) U.S. Cl. ........................ 359/388; 359/385; 359/381; 359/368

(58) Field of Classification Search ......... 359/368–390, 359/434–435
See application file for complete search history.

(56) References Cited

U.S. PATENT DOCUMENTS 4,063,797 A * 12/1977 Taira ........................... 359/385
5,777,784 A * 7/1998 Tanaka ........................ 359/388
6,507,434 B2 * 1/2003 Miyashita ................... 359/387
6,985,288 B2 * 1/2006 Miyashita et al. ........... 359/385

FOREIGN PATENT DOCUMENTS

JP     06-289301     10/1994
JP     2005-283879   10/2005

* cited by examiner

*Primary Examiner*—Thong Nguyen
(74) *Attorney, Agent, or Firm*—Pillsbury Winthrop Shaw Pittman LLP (57) ABSTRACT

The invention related to an epi illumination optical system for microscopes wherein both a simple yet bright Köhler illumination system and a collective lens array using a collective lens less susceptible of illumination fluctuations are easily interchangeable in simple constructions. The invention provides an epi illumination optical system for microscopes, with a microscope objective lens that also serves as a condenser lens, which also comprises a relay lens. The first illumination optical system comprises a light source, and a collector lens, and a second illumination optical system comprises a light source, a collimate lens and a lens array provided in an interchangeable way.

11 Claims, 7 Drawing Sheets

EPI ILLUMINATION OPTICAL SYSTEM FOR MICROSCOPES

This application claims benefit of Japanese Application No. 2006-150993 filed in Japan on May 31, 2006, the contents of which are incorporated by this reference.

BACKGROUND OF THE INVENTION

The present invention relates generally to an epi illumination optical system for microscopes, and more particularly to an epi illumination optical system for microscopes, which can be used with two interchangeable different illumination optical systems.

For light sources used for epi illumination for optical microscopes, mercury lamps, and xenon lamps are usually often used for the reason of their brightness and availability. For an illumination optical system, an optical system capable of Köhler illumination is used, as described in Patent Publication 1. The publication describes that the optical system involved is built up of a light source, a collector lens and a relay lens, showing a simple arrangement wherein a light source image is formed through that optical system at the exit pupil position of an objective lens.

On the other hand, Patent Publication 2 comes up with an epi illumination optical system adapted to form a light source image array using a collector lens array, and form the image of that light source image array at the exit pupil position of an objective lens.

Patent Publication 1
JP (A) 6-289301
Patent Publication 2
JP (A) 2005-283879

SUMMARY OF THE INVENTION

The present invention has for its object the provision of an epi illumination optical system for microscopes wherein a simple yet bright illumination system and an illumination system less susceptible of illumination fluctuations are interchangeably used in a simple arrangement.

According to the invention, this object is achievable by the provision of an epi illumination optical system for microscopes with an objective lens that also serves as a condenser lens, characterized in that:

at least a portion of a relay optical system adapted to form an image of a light source at a back focal position of an objective lens provides a common portion, and on an incidence side thereof, there are a first illumination optical system that at least comprises a light source and a collector lens and a second illumination optical system that at least comprises a light source, a collimate lens and a collective lens array located in such an interchangeable way that the positions of images of the light sources formed by the respective optical systems align with each other.

Preferably in the invention, the aforesaid first illumination optical system comprises an aperture stop on the exit side of said collector lens.

Preferably in the invention, the aforesaid second illumination optical system comprises an aperture stop at the position of an image array of the light source formed by said collective lens array.

In one embodiment of the invention, the aforesaid first illumination optical system may be designed such that the real image of the light source is not formed by said collector lens.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 1 is illustrative of the epi illumination optical system for microscopes according to one embodiment of the invention.

DESCRIPTION OF THE PREFERRED EMBODIMENTS

The epi illumination optical system for microscopes according to the invention (hereinafter called the epi illumination optical system) is now explained with reference to its specific embodiment.

Figure 1A:
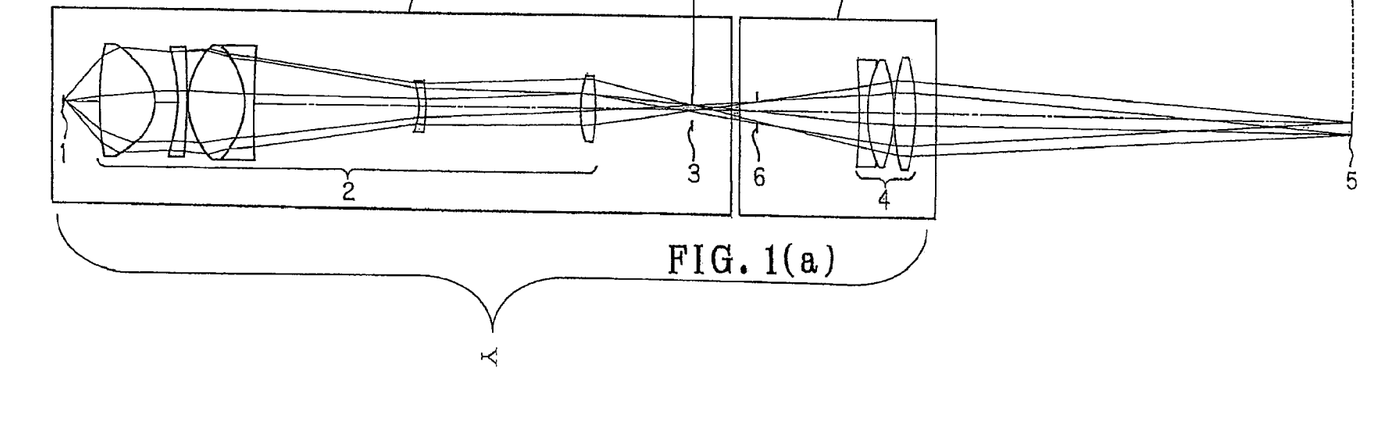
FIG. 1(a) is a taken-apart optical path diagram for a simple Köhler illumination system and FIG. 1(b) is a taken-apart optical path diagram for a Köhler illumination system using a collective lens array.
Figure 1B:
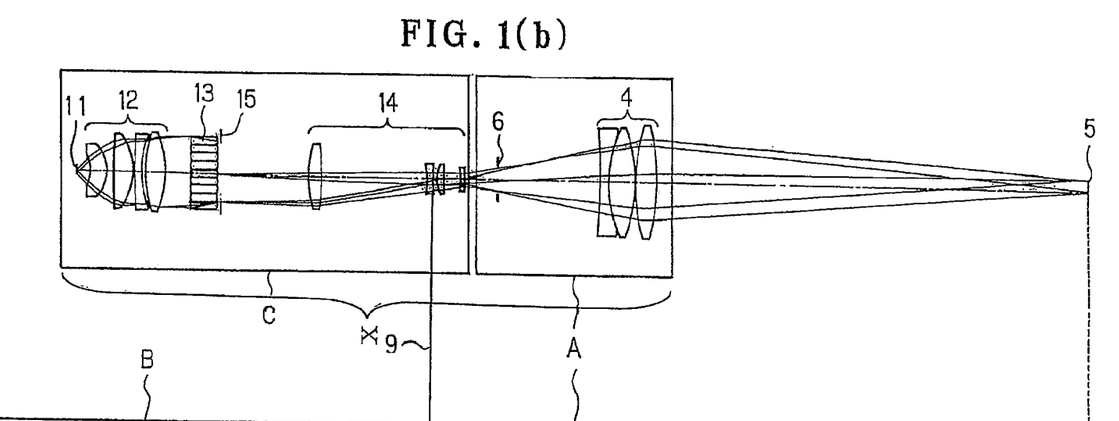

FIG. 1 is a taken-apart optical path diagram illustrative of the epi illumination optical system according to the first embodiment of the invention. Both FIGS. 1(a) and 1(b) here are illustrative of Köhler illumination. More specifically, FIG. 1(a) shows an epi illumination optical system made up of a single lens or a cemented lens composed of a plurality of single lenses (hereinafter called the illumination optical system X), and FIG. 1(b) shows an epi illumination optical system using a collective lens array (hereinafter called the illumination optical system Y). The epi illumination optical system further comprises a microscope objective lens that also serves as a condenser lens, although not illustrated in both FIGS. 1(a) and 1(b).

The illumination optical system X of FIG. 1(a) is first explained. The illumination optical system X is built up of a light source 1, a collector lens 2, an aperture stop 3, a field stop 6 and a relay lens 4. For the collector lens 2, and the relay lens 4, a single lens or a cemented lens composed of a plurality of single lenses is used. This illumination optical system X has none of the array-form lens (lens array).

With the illumination optical system X, divergent light from the light source 1 is collected by the collector lens 2 and at the position of that collection there is an intermediate image (the image of the light source 1) formed. The aperture stop 3 is located at the position of that intermediate image. Light diverging from the position of the intermediate image is re-collected at the relay lens 4. The position of that collection aligns with an exit pupil position 5 that is the back focal position of the microscope objective lens (not shown). Therefore, the image of the light source 1 is formed at the exit pupil position 5 of the microscope objective lens. Between the aperture stop 3 and the relay lens 4, there is the field stop 6 located. The position of the field stop 6 is conjugate to the plane of a sample (not shown).

The illumination optical system Y of FIG. 1(b) is then explained. The illumination optical system Y is built up of a light source 11, a collimate lens 12, a lens array 13, an aperture stop 15, an image position adjustment optical system 14, a field stop 6 and a relay lens 4. For each of the collimate lens 12, image position adjustment optical system 14 and relay lens 4, a single lens or a cemented lens composed of a plurality of single lenses is used. On the other hand, the lens array 13 comprises a plurality of identical positive lenses (microlenses) located in an array form.

With the illumination optical system Y, divergent light from the light source 11 is collimated by the collimate lens 12. The collimated light enters the lens array 13. The lens array 13 has an exit side lens surface in alignment with the back focal position. Therefore, the collimated light incident on the lens array 13 is collected on the exit side lens surface: an intermediate image (the image of the light source 11) is formed at the exit side lens surface. The then intermediate image (the light source image array) is going to be formed corresponding to the sequence and number of the positive lenses (microlenses) The image position adjustment optical system 14 forms a virtual image of that intermediate image. The virtual image is formed at a position 9 corresponding to the position of the aperture stop 3 in FIG. 1(a). Light diverging from that virtual image is collected at an exit pupil position 5 via the field stop 6 and relay lens 4. Note here that the exit pupil position 5 is the back focal position of a microscope objective lens (not shown), as in FIG. 1(a). The image of the light source 11 (or the intermediate image) is thus formed at the exit pupil position 5. The aperture stop 15 is located at the position of the exit side lens surface of the lens array 13, viz., at the position with the intermediate layer formed at it.

As shown in FIGS. 1(a) and 1(b), the relay lens 4 is used at the same position in both the illumination optical systems X and Y. In other words, the relay lens 4 provides a common lens system (common optical system) to both the illumination optical systems X and Y. The field stop 6, too, is used at the same position in both the illumination optical systems X and Y. In other words, the field stop 6, too, is common to both the illumination optical systems X and Y. Note here that if the relay lens 4 and field stop 6 are thought of as an integral piece, it means that the common lens system includes the field stop 6.

Now that the relay lens 4 and field stop 6 are a common portion, there are three separate portions involved in the illumination optical system X: light source 1, collector lens 2 and aperture stop 3, of which at least light source 1 and collector lens 2 may be separate portions (the first illumination optical system). In the illumination optical system Y, on the other hand, there are five separate portions involved: light source 11, collimate lens 12, lens array 13, aperture stop 15 and image position adjustment optical system 14, of which at least light source 11, collimate lens 12 and lens array 13 may be separate portions (the second illumination optical system).

In the illumination optical system Y, an intermediate image (the image of the light source 11) is formed by the image position adjustment optical system 14 and relay lens 4 at the exit pupil position 5. In other words, the image position adjustment optical system 14 and relay lens 4 form together a relay optical system. To put it another way, the relay lens 4 may be taken as a part of the relay optical system.

In the embodiment here, an optical system A made up of field stop 6 and relay lens 4 is thus common to the illumination optical system X of FIG. 1(a) and the illumination optical system Y of FIG. 1(b). And then, on the incidence side of the optical system A, an optical system B made up of light source 1, collector lens 2 and aperture stop 3 (FIG. 1(a)) and an optical system C made up of light source 11, collimate lens 12, lens array 13 and image position adjustment optical system 14 (FIG. 1(b)) are interchangeable such that the light source images align at the position 9. This allows the illumination optical system X to implement simple yet bright Köhler illumination and the illumination optical system Y to implement Köhler illumination less susceptible of illumination fluctuations. Thus, the embodiment here provides an epi illumination optical system for microscopes which enables two optical systems to be used in an interchangeable manner.

Figure 2:
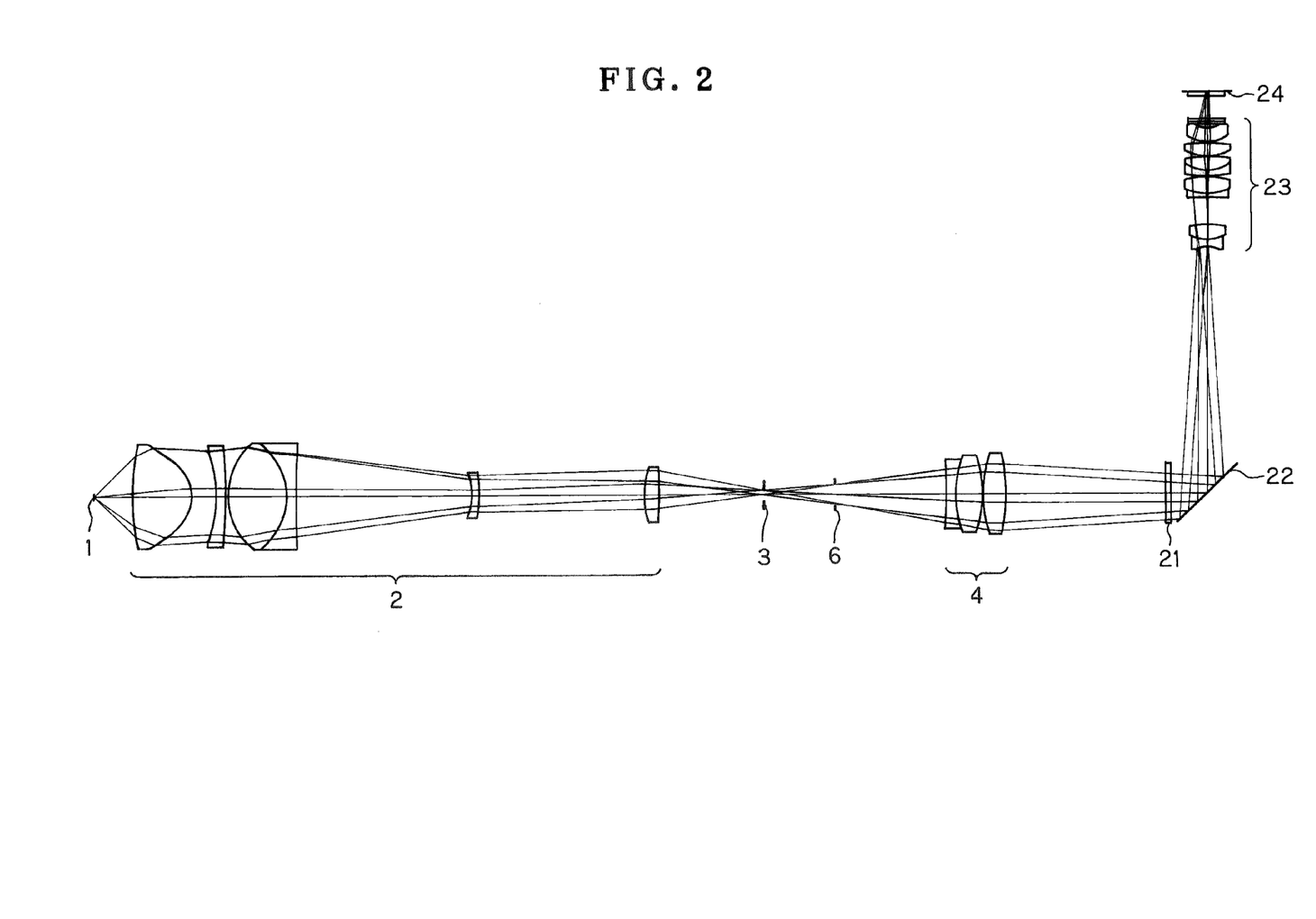
FIG. 2 is an optical path diagram illustrative of the whole construction of the illumination optical system used with the simple Köhler illumination system in the embodiment of FIG. 1.
Figure 3:
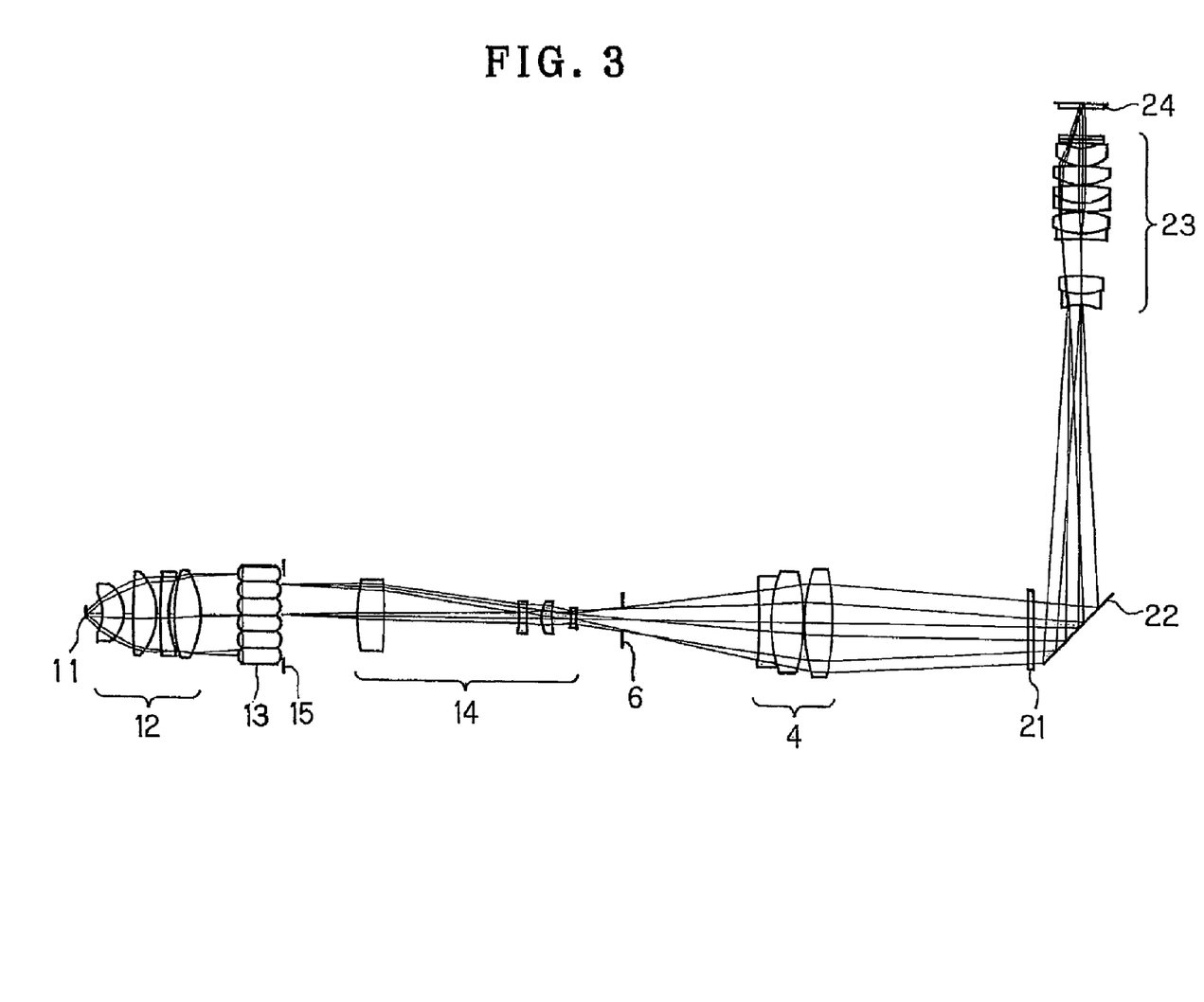
FIG. 3 is an optical path diagram illustrative of the whole construction of the illumination optical system used with the Köhler illumination system using the collective lens array in the embodiment of FIG. 1.

The whole construction of the illumination optical system in the embodiment here is shown in the optical path diagrams of FIGS. 2 and 3: FIG. 2 shows the construction of the embodiment using the illumination optical system X of FIG. 1(a) and FIG. 3 shows the construction of the embodiment using the illumination optical system Y of FIG. 1(b). In the epi illumination optical system, a microscope objective lens 23 serves as its condenser lens. The relay lens 4 and field stop 6, too, are used commonly. Therefore, a band-pass filter 21 and a dichroic mirror 22, too, are used commonly to both the illumination optical systems X and Y.

Whether FIG. 2 or FIG. 3, light rays that form the image of light source 1 or the image of light source 11 (light source image array) focus on the exit pupil position 5 (FIG. 1) that is the back focal position of the microscope objective lens (condenser lens) 23. On the other hand, the plane 24 of a sample is positioned at the front focal position of the microscope objective lens (condenser lens) 23. Both the embodiments of FIGS. 2 and 3 make it possible to illustrate the sample plane 24 in Köhler illumination form.

Figure 4:
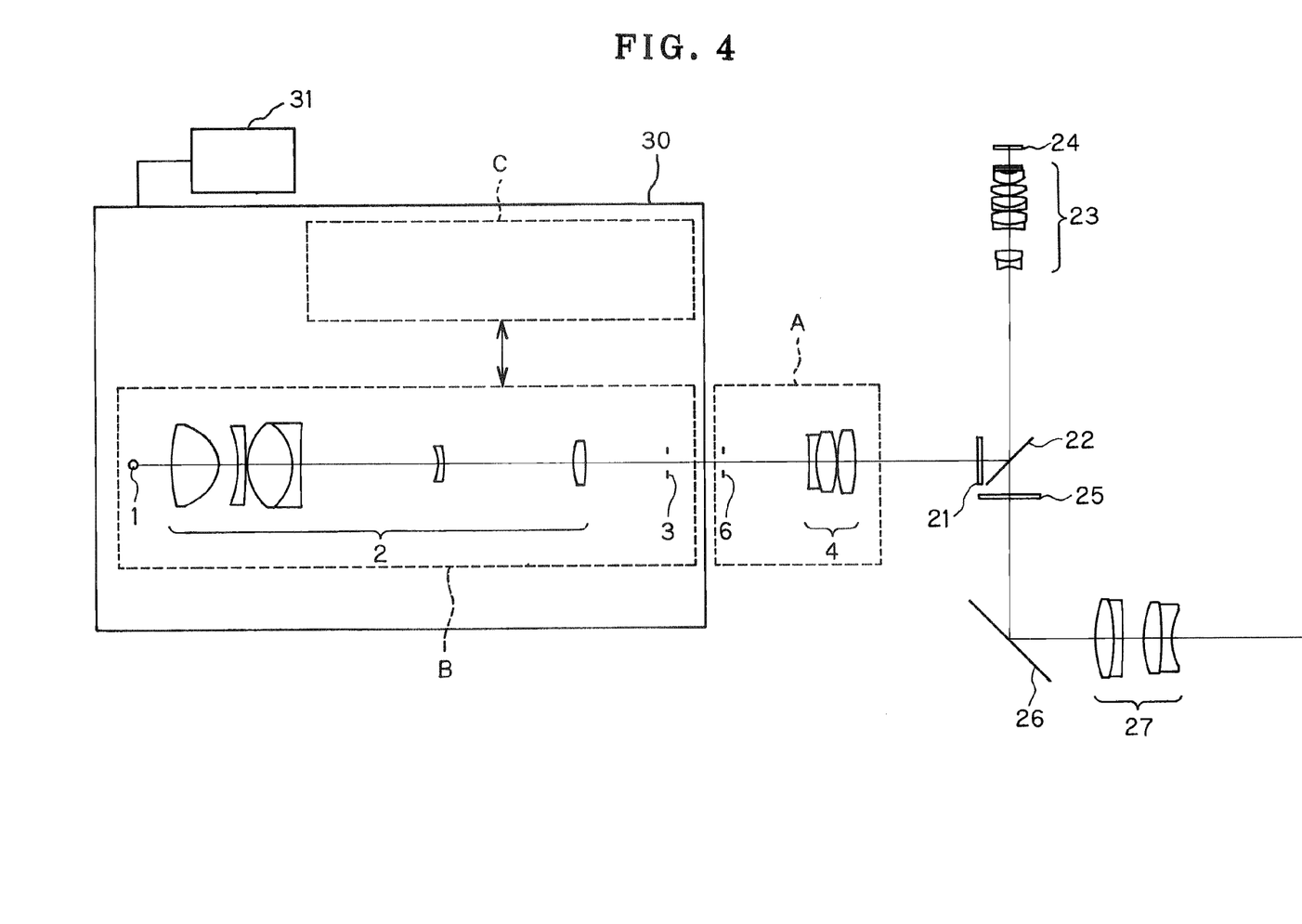
FIG. 4 is an optical path diagram inclusive of a part of the optical system of the microscope in the embodiment of FIG. 1.

FIG. 4 is an optical path diagram inclusive of a part of the optical system of a microscope. More specifically, FIG. 4 shows the illumination optical system X of FIG. 1(a) located in the optical path. An optical path for the illumination optical system Y is not shown, and the construction of the optical system C that forms the illumination optical system Y is not shown, either.

The microscope optical system of FIG. 4 comprises an excited light cut filter 25, a reflecting mirror 26, an imaging lens 27 and a moving mechanism 30. in the embodiment here, a known stage is used for the moving mechanism 30. Further, there is a controller 31 provided for control of the stage 30. In FIG. 4, the optical systems B and C are juxtaposed on the stage 30. The stage 30 is designed in such a way as to be movable in a direction orthogonal to the optical axis. Therefore, if the stage 30 is moved, it is then possible to locate either one of the optical systems B and C in the optical path. It is thus possible to select illumination by the illumination optical system X or Y, The optical systems B and C may be held on a turret in place of the stage 30, and if the turret is rotated, it is then possible to locate either one of the optical systems B and C in the optical path.

It is here noted that the microscope objective lenses 23 of FIGS. 2, 3 and 4 are each an infinity correction optical system. Therefore, light from the sample (test sample) is collimated at the microscope objective lens 23. The collimated light enters the imaging lens 27 via the dichroic mirror 22, excited light cut filter 25 and reflecting mirror 26. And then, the light is magnified and formed by the imaging lens 27 at a given position. The magnified and formed image may be enlarged and viewed through an eyepiece, or taken and measured through a taking optical system.

Figure 5A:
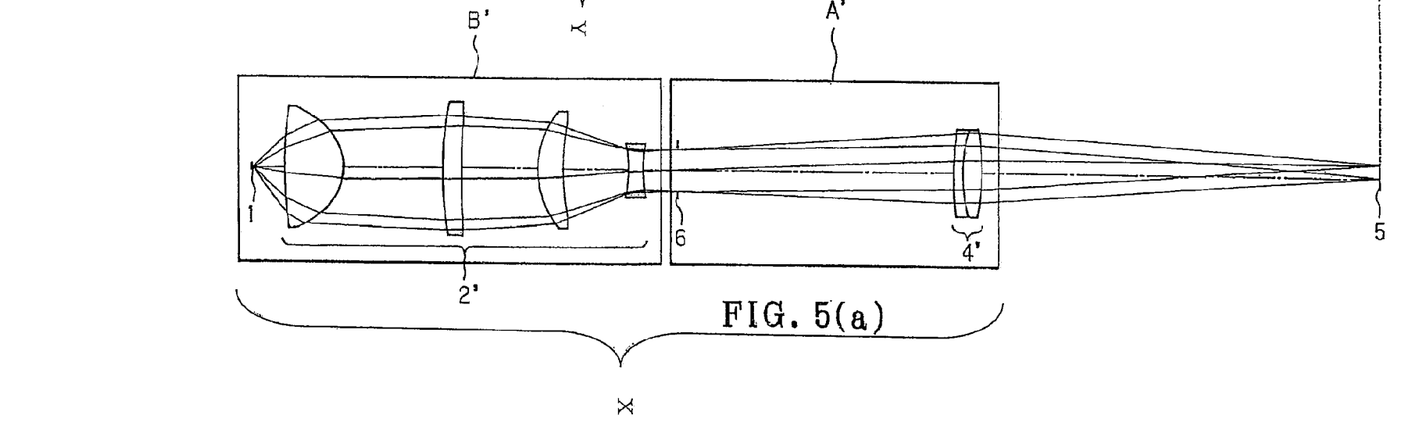
FIG. 5 is illustrative of the epi illumination optical system for microscopes according to another embodiment of the invention.
Figure 5B:
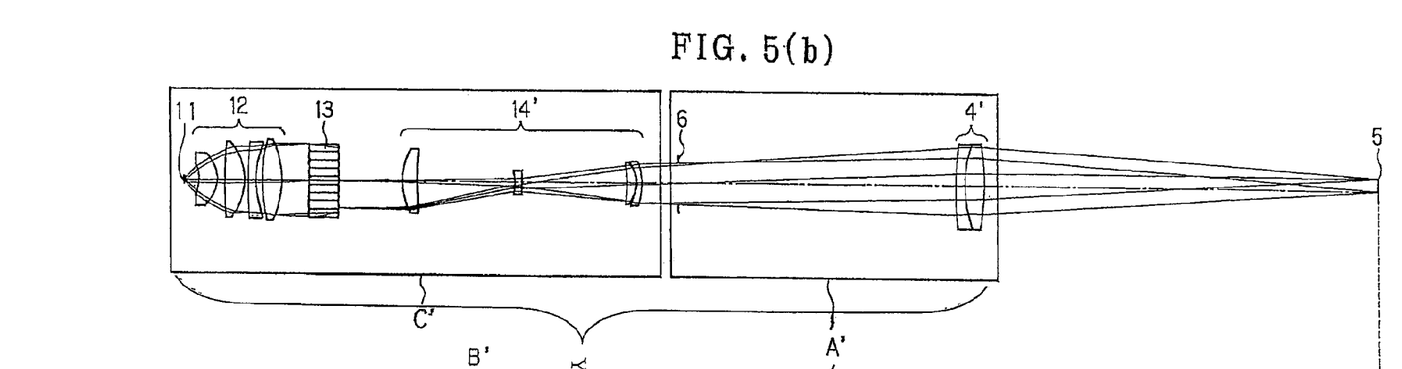

Then, the epi illumination optical system for microscopes according to the second embodiment of the invention is explained. In the embodiment here, there is no intermediate image (real image) formed. Therefore, the illumination optical system X according to the embodiment here has none of the aperture stop. FIG. 5 is a taken-apart optical path diagram illustrative of the epi illumination optical system for microscopes according to the second embodiment of the invention. Both FIGS. 5(*a*) and 5(*b*) are illustrative of Köhler illumination. More specifically, FIG. 5(*a*) shows an epi illumination optical system made up of a single lens or a cemented lens composed of a plurality of single lenses (hereinafter called the illumination optical system X'), and FIG. 5(*b*) shows an epi illumination optical system using a lens array (hereinafter called the illumination optical system Y'). The epi illumination optical system further comprises a microscope objective lens that also serves as a condenser lens, although not illustrated in both FIGS. 5(*a*) and 5(*b*).

The illumination optical system X' of FIG. 5(*a*) is first explained. The illumination optical system X' is built up of a light source 1, a collector lens 2', a field stop 6 and a relay lens 4'. For the collector lens 2', and the relay lens 4', a single lens or a cemented lens composed of a plurality of single lenses is used. This illumination optical system X' has none of the array-form lens (lens array).

With the illumination optical system X', divergent light from the light source 1 is collected by the collector lens 2', but it leaves the collector lens 2' in the form of slight divergent light. For this reason, there is no real intermediate image of the light source 1 formed in the illumination optical system X'; there is a virtual image formed way off on the light source 1 side. Light diverging from that distant virtual image is collected at the relay lens 4'. The position of that collection is in alignment with an exit pupil position 5 that is the back focal position of the microscope objective lens (not shown). Therefore, an image of the light source 1 is going to be formed at the exit pupil position 5 of the microscope objective lens. Between the collector lens 2' and the relay lens 4', there is the field stop 6 located. The position of the field stop 6 is conjugate to the plane of a sample (not shown).

The illumination optical system Y' of FIG. 5(*b*) is then explained. The illumination optical system Y' is built up of a light source 11, a collimate lens 12, a lens array 13, an image position adjustment optical system 14', a field stop 6 and a relay lens 4". For each of the collimate lens 12, image position adjustment optical system 14' and relay lens 4', a single lens or a cemented lens composed of a plurality of single lenses is used, On the other hand, the lens array 13 comprises a plurality of identical positive lenses (microlenses) located in an array form.

With the illumination optical system Y', divergent light from the light source 11 is collimated by the collimate lens 12. The collimated light enters the lens array 13. The lens array 13 has an exit side lens surface in alignment with the back focal position. Therefore, the collimated light incident on the lens array 13 is collected on the exit side lens surface: an intermediate image (the image of the light source 11) is formed at the exit side lens surface. The then intermediate image (the light source image array) is going to be formed corresponding to the sequence and number of the positive lenses (microlenses). The image position adjustment optical system 14' forms a virtual image of that intermediate image. The position of the virtual image is corresponding to the position of the virtual image of the light source 1 in the distance, as shown in FIG. 5(*a*). Light diverging from that virtual image is collected at the exit pupil position 5 via the field stop 6 and relay lens 4'. Note here that the exit pupil position 5 is the back focal position of the microscope objective lens (not shown), as in FIG. 5(*a*). The image of the light source 11 (or the intermediate image) is thus formed at the exit pupil position 5.

As shown in FIGS. 5(*a*) and 5(*b*), the relay lens 4' is used at the same position in both the illumination optical systems X' and Y': the relay lens 4' is going to be a common lens system (common optical system) to both the illumination optical systems X' and Y'. The field stop 6, too, is used at the same position in both the illumination optical systems X' and Y'. Therefore, the field stop 6, too, would be common to both the illumination optical systems X' and Y'. Note here that if the relay lens 4' and field stop 6 are thought of as an integral piece, it means that the common lens system includes the field stop 6.

Now that the relay lens 4' and field stop 6 are a common portion, there are two separate portions involved in the illumination optical system X': light source 1 and collector lens 2'. Therefore, at least the light source 1 and collector lens 2' may be separate portions (the first illumination optical system). In the illumination optical system Y', on the other hand, there are four separate portions involved: light source 11, collimate lens 12, lens array 13, and image position adjustment optical system 14', of which at least light source 11, collimate lens 12 and lens array 13 may be separate portions (the second illumination optical system).

In the illumination optical system Y', an intermediate image (the image of the light source 11) is formed by the image position adjustment optical system 14' and relay lens 4' at the exit pupil position 5. That is, the image position adjustment optical system 14' and relay lens 4, form together a relay optical system. To put it another way, the relay lens 4' may be taken as a part of the relay optical system.

In the embodiment here, too, an optical system A' made up of field stop 6 and relay lens 4' is thus common to the illumination optical system X' of FIG. 5(*a*) and the illumination optical system Y' of FIG. 5(*b*). And then, on the incidence side of the optical system A', an optical system B' made up of light source 1 and collector lens 2' (FIG. 5(*a*)) and an optical system C' made up of light source 11, collimate lens 12, collective lens array 13 and image position adjustment optical system 14' (FIG. 5(*b*)) are interchangeable. In that case, the optical systems B' and C' are interchanged at the position of the virtual image of the light source 1 in the distance. This allows the illumination optical system X' to implement simple yet bright Köhler illumination and the illumination optical system Y' to implement Köhler illumination less susceptible of illumination fluctuations. Thus, the embodiment here provides an epi illumination optical system for microscopes which enables two optical systems to be used in an interchangeable manner.

Figure 6:
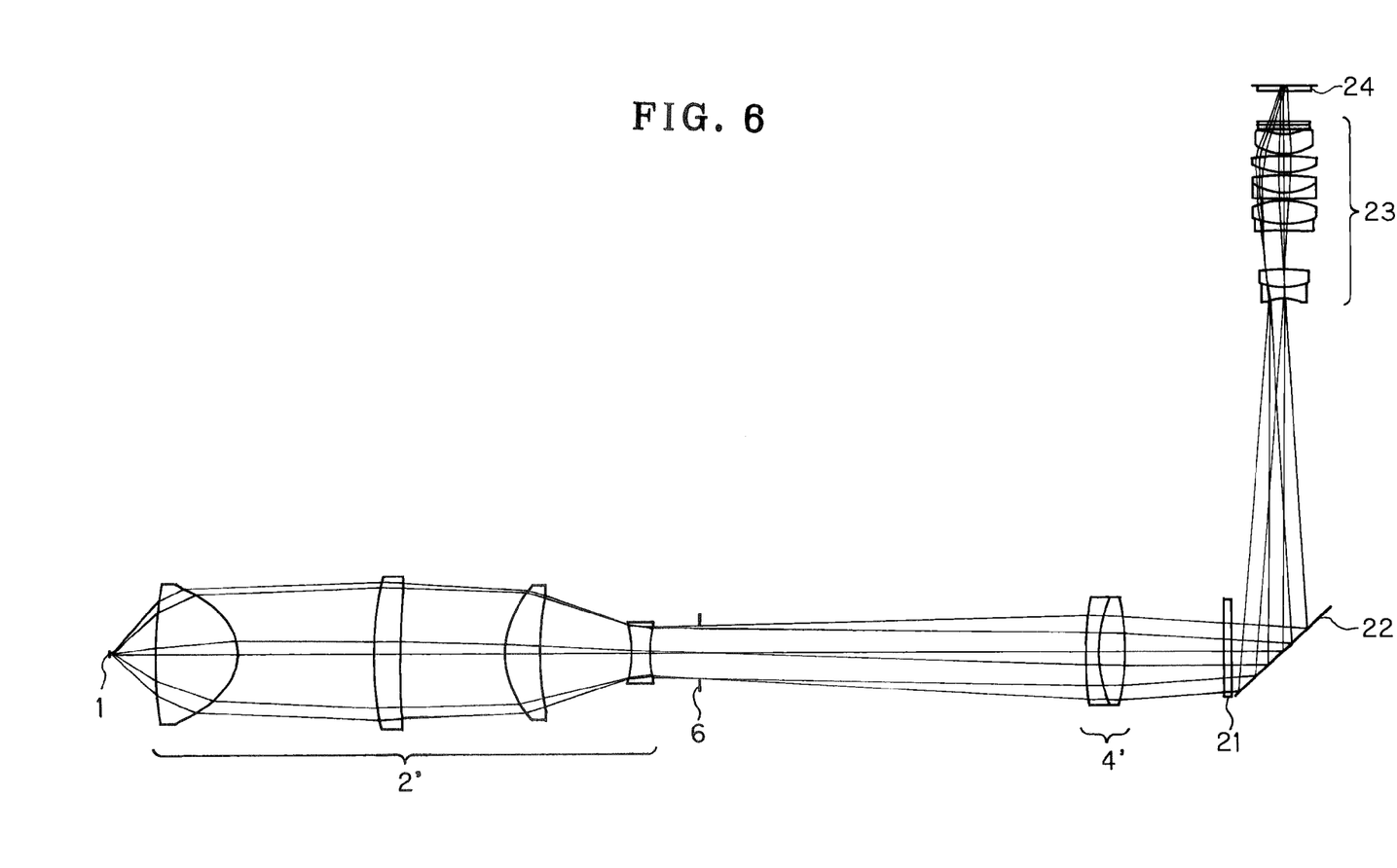
FIG. 6 is an optical path diagram illustrative of the whole construction of the illumination optical system used with the simple Köhler illumination system in the embodiment of FIG. 5.
Figure 7:
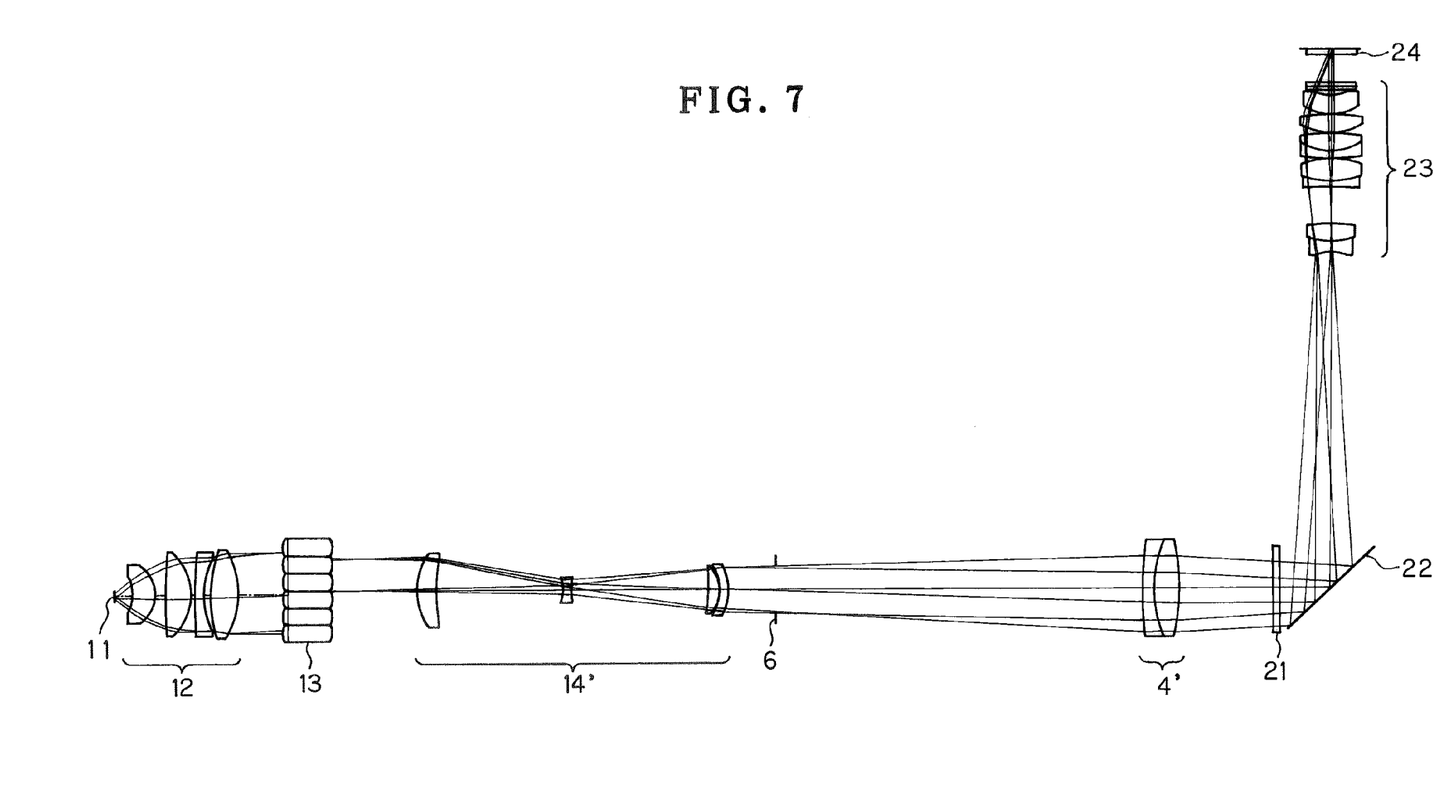
FIG. 7 is an optical path diagram illustrative of the whole architecture of the illumination optical system used with the Köhler illumination system using the collective lens array in the embodiment of FIG. 5.

The whole construction of the illumination optical system in the embodiment here is shown in the optical path diagrams of FIGS. 6 and 7: FIG. 6 shows the construction of the embodiment using the illumination optical system X' of FIG.

5(a) and FIG. 7 shows the construction of the embodiment using the illumination optical system Y' of FIG. 5(b). In the epi illumination optical system, the microscope objective lens 23 is going to serve as its condenser lens. The relay lens 4' and field stop 6, too, are used commonly, so that the band-pass filter 21 and dichroic mirror 22, too, are going to be used commonly to both the illumination optical systems X' and Y'.

Whether FIG. 6 or FIG. 7, light rays that form the image of light source 1 or the image of light source 11 (light source image array) focus on the exit pupil position 5 (FIG. 5) that is the back focal position of the microscope objective lens (condenser lens) 23. On the other hand, the plane 24 of a sample is positioned at the front focal position of the microscope objective lens (condenser lens) 23. Therefore, both the embodiments of FIGS. 6 and 7 make it possible to subject the sample plane 24 to Köhler illumination. Note here that an optical path diagram inclusive of a part of the optical system in the microscope of this embodiment corresponding to FIG. 4 is left out.

In the embodiments of the epi illumination optical system as described above, at least a part of the optical system adapted to form the image of the light source at the exit pupil (back focal) position of the microscope objective lens, viz., all the field stop 6 and relay lens 4, 4' are common portions. This enables the epi illumination optical system to be built up in fewer parts count and, hence, simple structure at lower costs. Further, the illumination system giving weight to brightness and the illumination system giving weight to less illumination fluctuations are used in an interchangeable way.

While the inventive epi illumination optical system for microscopes has been described with reference to its specific embodiments, it should be understood that the present invention is never limited to them and so various modifications would be possible.

What is the claimed is:

1. An epi illumination optical system for microscopes, with an objective lens that also serves as a condenser lens, wherein:
   on an incidence side of a common optical system comprising at least a relay lens, there are a first illumination optical system that at least comprises a light source and a collector lens and a second illumination optical system that at least comprises a light source, a collimate lens and a lens array provided in an interchangeable way.

2. The epi illumination optical system according to claim 1, wherein said common optical system includes a field stop.

3. The epi illumination optical system according to claim 1, wherein said first illumination optical system comprises an aperture stop on a side of said collector lens that faces said objective lens.

4. The epi illumination optical system according to claim 1, wherein said second illumination optical system comprises an aperture stop at a position at which light is collected by said lens array.

5. The epi illumination optical system according to claim 1, wherein said first illumination optical system is an optical system wherein a virtual image of said light source is formed by said collector lens.

6. An epi illumination optical system adapted to implement illumination via an objective lens, wherein:
   said epi illumination optical system comprises a relay optical system adapted to form an image of an light source at a back focal position of said objective lens, wherein:
   said relay optical system comprising a common optical system and a first illumination optical system or said relay optical system comprises a common optical system and a second illumination optical system, wherein:
   said first illumination optical system at least comprises said light source and a collector lens,
   said second illumination optical system at least comprises said light source, a collimate lens and a lens array, and
   there is a moving mechanism provided to locate either one of said first illumination optical system and said second illumination optical system in an optical path.

7. An epi illumination optical system for microscopes, with an objective lens that also serves as a condenser lens, wherein:
   at least a portion of a relay optical system adapted to form an image of a light source at a back focal position of an objective lens provides a common portion, and on an incidence side thereof, there are a first illumination optical system that at least comprises a light source and a collector lens and a second illumination optical system that at least comprises a light source, a collimate lens and a lens array located in such an interchangeable way that positions of images of the light sources formed by the respective optical systems align with each other.

8. The epi illumination optical system for microscopes according to claim 7, said at least a portion of the relay optical system adapted to form an image of a light source at a back focal position of a microscope objective lens and a field stop form together a common optical system.

9. The epi illumination optical system according to claim 7, wherein said first illumination optical system comprises an aperture stop on an exit side of said collector lens.

10. The epi illumination optical system according to claim 7, wherein said second illumination optical system comprises an aperture stop at a position of an image array of a light source formed by said lens array.

11. The epi illumination optical system according to claim 7, wherein in said first illumination optical system, a real image of a light source is not formed by said collector lens.

\* \* \* \* \*